Sept. 28, 1937.   H. A. FISHER   2,094,529
ORNAMENTAL ASSEMBLY AND METHOD OF MANUFACTURING THE SAME
Filed Sept. 20, 1935   3 Sheets-Sheet 1
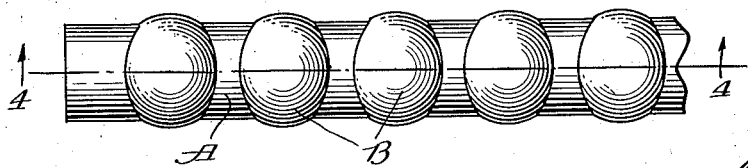
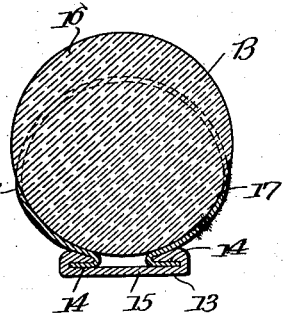
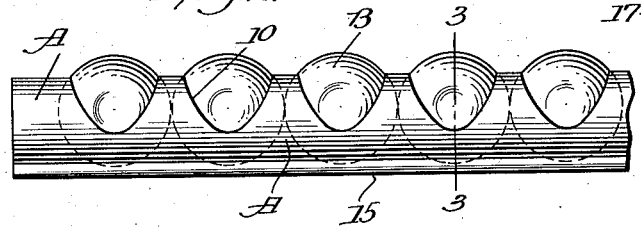
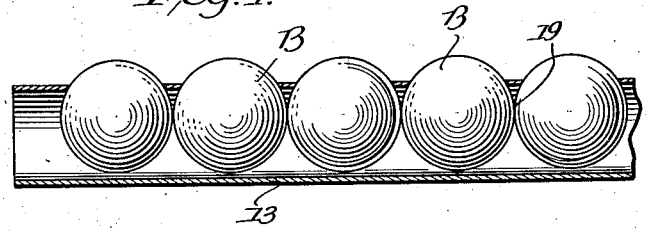
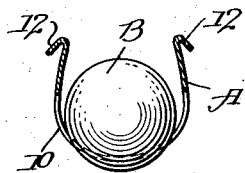
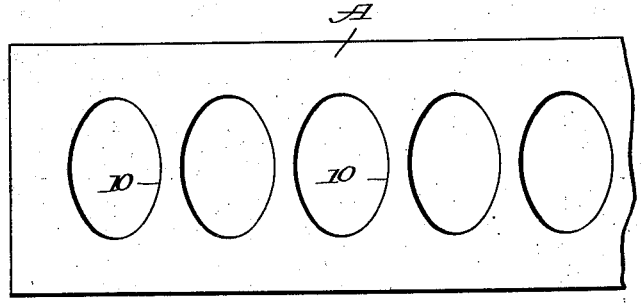
Inventor
Henry A. Fisher Sept. 28, 1937. H. A. FISHER 2,094,529
ORNAMENTAL ASSEMBLY AND METHOD OF MANUFACTURING THE SAME
Filed Sept. 20, 1935 3 Sheets-Sheet 2
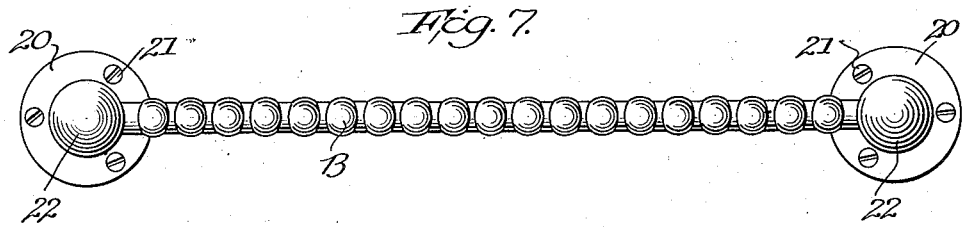
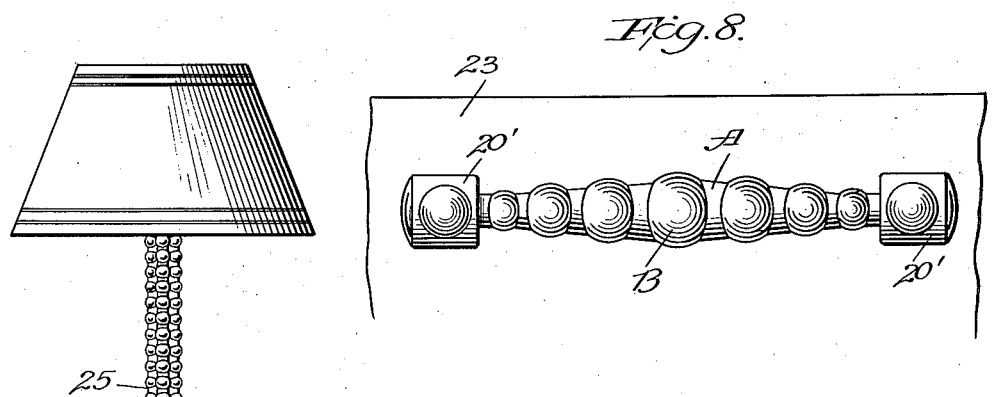
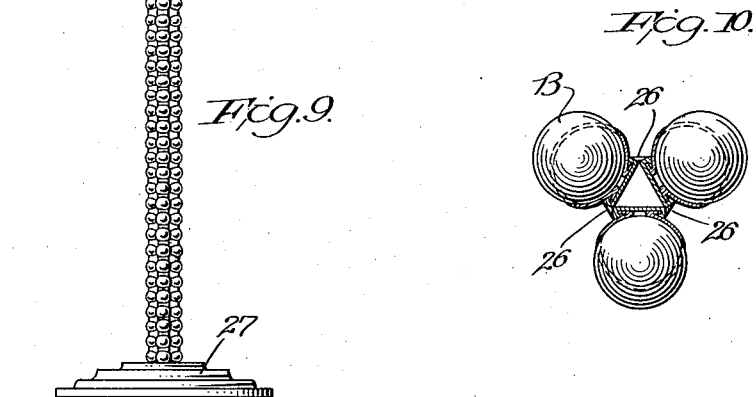
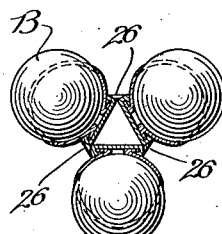
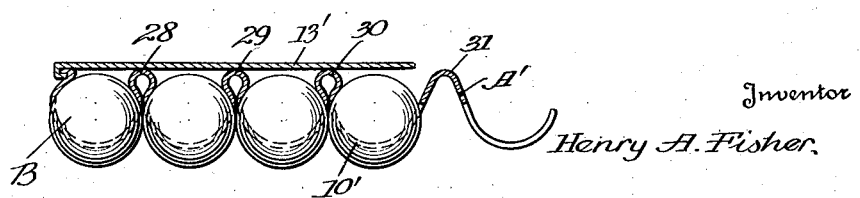
Inventor
Henry A. Fisher

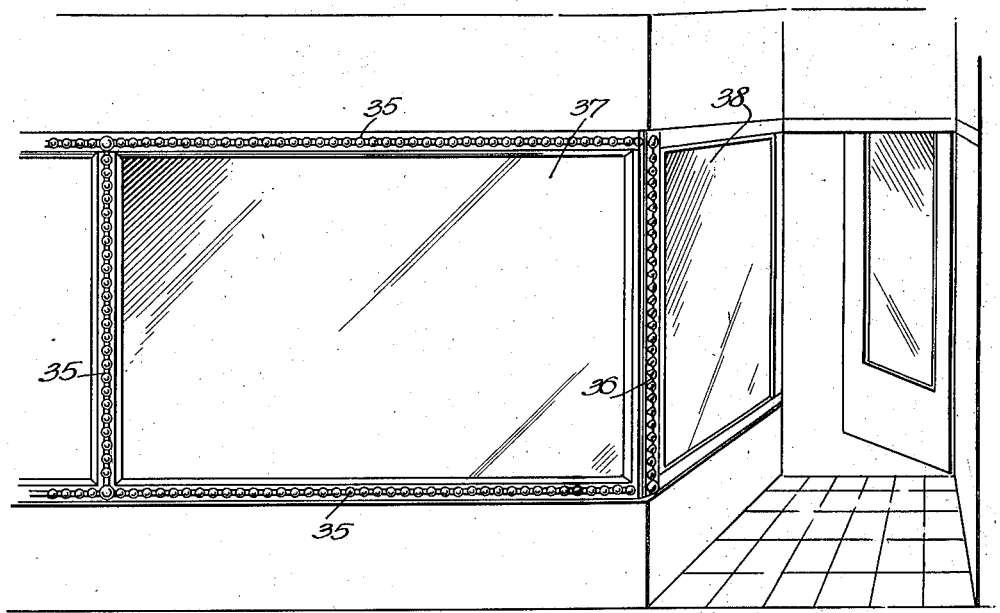
Fig. 12.
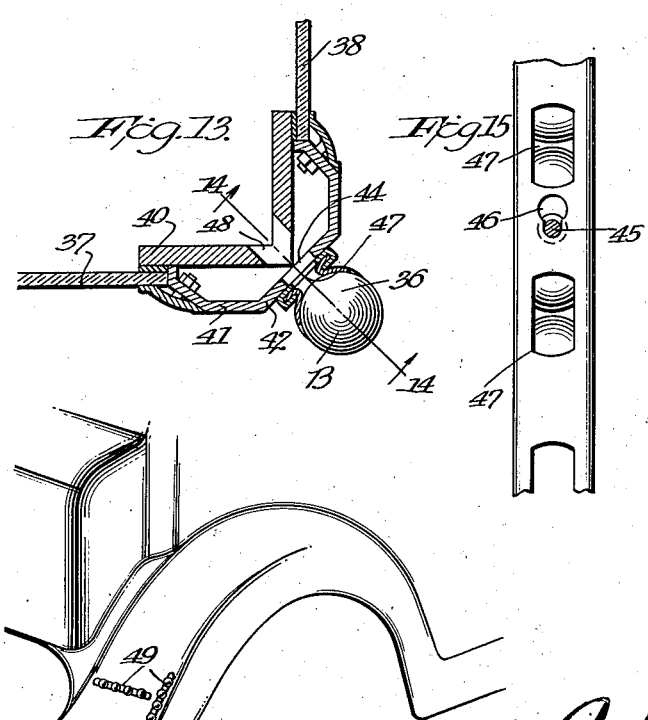
Fig. 13. Fig. 15.
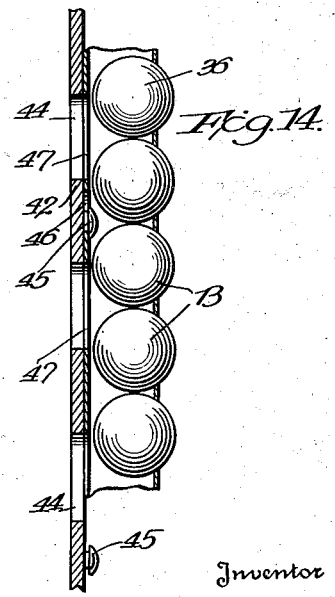
Fig. 14.
Fig. 16.

Patented Sept. 28, 1937

2,094,529

UNITED STATES PATENT OFFICE 2,094,529

ORNAMENTAL ASSEMBLY AND METHOD OF MANUFACTURING THE SAME

Henry A. Fisher, Parkersburg, W. Va.

Application September 20, 1935, Serial No. 41,493

18 Claims. (Cl. 41—10)

The present invention relates to a structural member and methods of fabricating the same.

The principal object of the invention is to provide a structural member of general utility, which presents a pleasing appearance.

Another object of the invention is to provide such a structural member which may be manufactured from a minimum number of parts at little expense.

A further object of the invention is to provide for manufacturing a structural member in different sizes and lengths for various uses, which may be cut off in desired lengths for the particular use for which it is intended.

Another object of the invention is to provide a method of manufacturing a structural member of pleasing appearance and of sufficiently rigid construction to adapt it for diverse uses.

In the drawings, which are illustrative of one form of the invention, and in no sense restrictive, Figure 1 is a plan view of a length of the structural member;

Figure 2 is a side elevation of a length of the structural member;

Figure 3 is a transverse vertical sectional view taken along the line 3—3 of Figure 2;

Figure 4 is a partial longitudinal sectional view of a length of the structural member along the line 4—4 of Figure 1, showing the decorative elements in position therein;

Figure 5 is a plan view of a sheet of material which forms one of the parts of the structural member;

Figure 6 is a partial transverse vertical sectional view of the structural member, showing the same partially formed;

Figures 7 and 8 show the structural member of the invention adapted for particular uses;

Figure 9 shows a plurality of structural members assembled together to form a member of an article of furniture or the like;

Figure 10 shows a manner in which a plurality of structural members of the invention may be assembled together;

Figure 11 shows a modified form of the invention.

Figure 12 shows a plurality of sections of the structural member employed as a border for plate glass windows, for example, the plate glass windows of a store front.

Figure 13 is a horizontal sectional view through the supporting structure for the plate glass window, showing a convenient manner of assembling the sections of the structural member, said section being through the corner of the plate glass store front of Figure 12.

Figure 14 is a partial vertical sectional view of the corner construction shown in Figure 12, along the lines 14—14 of Figure 13.

Figure 15 is a rear view of the structural member shown in Figure 14, and

Figure 16 is a view showing a section of the structural member applied to an automobile fender.

Referring particularly to Figures 1 and 2, the invention comprises a sheet of substantially rigid material A which may be bent into substantially columnar form to retain a plurality of decorative elements B.

In manufacturing the structural member of this invention, a rectangular sheet of substantially rigid material A, such as sheet metal, is formed with a plurality of apertures 10, as shown in Figure 5. These apertures may be of any suitable shape to retain the decorative elements, but they are preferably elliptical in contour, as disclosed, in order to receive and retain a decorative element such as a sphere or ball B.

While the apertures 10 may be formed in the sheet of material A in any convenient manner, I have found that for the purposes of this invention it is most efficient to stamp the apertures in said plate, and to form them in alignment, as shown in Figure 5.

After the sheet of material has been stamped, the decorative elements or balls are placed in the apertures, after which the sheet is bent back around the balls or spheres in the manner shown in Figure 6. This bending operation may be performed after the balls are placed in apertures in a flat or only slightly bent sheet, or the sheet may be bent preliminarily to the degree shown in Figure 6, this bending not being sufficient to prevent insertion of the balls into the apertures. The bending operation may be performed by hand, or by any suitable mechanism adapted to bend or shape sheet metal.

While the sheet of material is shown in the drawings as being bent so as to have a substantially circular cross section, it is obvious that said sheet could be bent to form a bar having substantially square or triangular cross section, or to any other desired shape.

In Figure 6, the opposing edges of the sheet of material are shown provided along their lengths with outwardly directed locking flanges 12 for securing said edges together, and they may be secured by bringing the edges toward one another and locking them by sliding along the length of the sheet a locking strip or slide 13 of the cross section shown in Figure 3. This locking strip is provided with opposed channels 14 formed by bending over and inwardly the edges of the strip, these channels being adapted to receive the locking flanges 12 of the sheet A as shown in Figure 3.

While the opposing edges of the sheet of material may be locked together by means of the locking strip or slide as discussed above, any other suitable means may be employed to secure the edges together. For instance, the width of the sheet could be increased so that the opposing edges abut or overlap one another, and in assembling the member, these abutting or overlapping edges could be soldered, riveted or welded together. However, the method and construction wherein the locking strip or slide is used is preferred, as this strip or slide may be made of material, such as metal, sufficiently rigid to materially strengthen the structural member and, furthermore, as shown in Figure 3, the strip or slide may be flat on its lower surface, as at 15, to provide for securing the structural member to any foundation, or to provide for securing together a plurality of the structural members to form an article as hereinafter described.

It will be noted in Figure 3 that, when using a decorative element in the form of a ball or sphere, and mounting the same in a bar having elliptical apertures therein, a substantial portion of the decorative element or ball protrudes beyond the surface of the bar, as shown at 16. In this figure, it will be observed that substantially more than 180° of a great circle of the ball or sphere between points 17 is unconfined by the bar. Referring to Figure 1, it will be noted that the diameter of a ball B transverse to the length of the structural member is greater than the transverse diameter of the columnar bar and is unconfined by the latter, thus providing maximum exposure of the decorative surface of the ball. This arrangement gives a chain-like appearance when viewed from a distance, it appearing that the structural member is made of decorative balls held together by rods or tubes of metal or the like which seem to pass through the balls or spheres. That is, it appears that the balls constitute the major part of the construction and that they support and carry the rods or tubes of metal, whereas in fact the balls are carried by the bent strip of metal or other material.

Referring to Figure 2, it will be observed that the diameter of each ball B is greater than the diameter of each elliptical aperture 10 taken longitudinally of the structural member, and this diameter of the ball is confined within the edges of the elliptical aperture and within the hollow portion of the bar. This construction provides for rigidly retaining the decorative elements or balls within the bar, and yet permits maximum exposure of the surface of the decorative elements.

Referring to Figures 2 and 4, it will be noted that the position and dimension of each elliptical aperture 10 is such that adjacent balls B of proper diameter contact with one another as shown at 19. The retaining of the adjacent balls in contact results in a sturdy and rigid structure, particularly when the bar is used as a structural supporting member in a vertical position, as the balls then form a column, one resting upon the other, said balls being held in column and in surface contact with one another by the sheet of material A which is formed around them. When used as a vertical supporting member, the bar may be cut so that the lowermost ball rests upon the foundation, or the end of the bar may be suitably plugged so that the lowermost ball will engage the same. The longitudinal rigidity caused by the surface contact of adjacent balls is augmented in the form of the invention disclosed in Figure 3 by the locking strip or slide 13.

While the invention may be used in the construction of various decorative articles and devices, I have shown in Figures 7 to 16 some uses for which the structural member of this invention is particularly adaptable.

In Figure 7, a length of the material described above is shown cut to proper length and held between brackets 20 to form a towel rack, automobile robe rail or the like. The brackets 20 may be of any conventional construction and provided with securing means 21 to secure them to any foundation, said brackets having portions 22 which extend upwardly or outwardly from the foundation, said portions being provided with any suitable socket or the like arrangement to receive and secure the ends of the decorative bar.

While various forms of decorative elements may be used, from a decorative standpoint, balls known as "marbles" are particularly adaptable, said marbles being made from molten glass or cullet. The marbles may be transparent, translucent or opaque, and may be of any desired color. To produce a more ornate effect, marbles may be used which are variegated in appearance, being composed of glass of different colors. The great utility of decorative bars fabricated in accordance with this invention will be apparent, as in towel racks and other similar fittings the marbles may be made of a color or colors to conform with the color scheme of the room or environment in which the fitting is to be used.

The color combinations available for the manufacture of articles using the structural members of the present invention are unlimited, as any color or colors of marbles may be used, and the metal sheet may be of appearance to conform with the color of the marbles. Transparent or translucent marbles give a pleasing light effect due to refraction and reflection of the light rays within the spheres, and the manner of mounting the marbles insures maximum exposure of the surface of the marbles to the light yet at the same time providing a rigid structural member.

In Figure 8, the invention is shown in the form of a handle for a door such as a stove door or the like. In this adaptation of the invention, the decorative bar is mounted between brackets 20', which may be secured to the door 23 in the same or a similar manner to that disclosed in connection with the towel bar shown in Figure 7. When used as a handle, it will be evident that by reason of the maximum exposure of the surface of the balls B, and their protruding beyond the surface of the columnar sheet A, the balls or the like serve as a convenient grip for the hand. In this connection, it is obvious that sections of the structural member could be applied and used as handles for various devices and articles. While a length of a bar of the type shown in Figures 1 to 7 could be used as a handle, I have shown a modified form of the structural member in Figure 8 which may be used with convenience in forming handles for doors and the like. In this construction, the decorative elements may be of varying diameter and, as shown, the diameters of the adjacent balls are smaller as the ends of the bar are approached. This construction not only adds to the attractive appearance of the handle, but also increases its utility as such by providing a more convenient grip for the hand. In fabricating a section of the structural member of the form shown in Figure 8, it is necessary to modify the shape of the blank of material shown in Figure 5 to substantially diamond shape, the acute apices of the diamond shaped blank being at opposite ends of the structural member. When making a structural member of this modified form, it is more convenient to secure the opposing edges of the blank when bent around the decorative elements by soldering, riveting or welding the same together, rather than using a securing means such as is disclosed in Figure 3.

Articles of furniture of distinctive modernistic appearance may be produced using sections of the structural member of this invention. In constructing furniture, it is sometimes desirable to use a plurality of the decorative bars assembled as in Figure 9 to form a single structural member 25. When a plurality of these structural members are assembled together as shown in Figure 9, not only will the strength of the article be increased, but it will also present an attractive appearance when viewed from any side. In Figure 10, one manner of assembling a plurality of structural members to form a unitary member is disclosed. In this figure, three of the structural members are shown assembled and secured together in side by side or back to back relation, adjacent edges of the retaining strip or slide 13 being secured to one another at 26, as by soldering, welding or the like. When the plurality of structural members are thus formed into a unitary member, they may be used alone as the leg or other member of a chair or the like, or they may be fixed to a base such as 27 shown in Figure 9 in order to provide a floor or table lamp.

While I have shown three structural members being assembled together in Figure 10, it is obvious that two of such members may be joined together back to back or four or more of the same may be assembled together as desired.

In Figure 11, a modification of the invention is shown wherein a relatively wide strip or sheet of decorative material may be made by practicing this invention. In this figure, a relatively wide sheet A' is provided with a plurality of rows of elliptical openings 10' identical with the single row shown in Figure 5, and balls or marbles B are placed in these apertures, after which the sheet of material may be crimped into corrugated form as shown, or the sheet may be stamped with the rows of apertures and formed in corrugated form as in Figure 11, and then the marbles may be slipped or sprung into the apertures. A relatively wide backing strip or slide 13' may then be secured to the back of the sheet in the manner described in connection with Figure 3. In fabricating a structural member or sheet in accordance with this modified method, the sheet may be left in flat condition, as shown in Figure 11, or the sheet and the backing strip or slide 13' may be bent back upon itself to form a member of substantially cylindrical form, as a substitute for the assembly of Figure 9.

A sheet having a plurality of rows of apertures as shown in Figure 11 may be cut at points 28, 29, 30 and 31 to form a plurality of bars of the type disclosed in Figure 6, or the sheet may be cut at points 28 and 30 to form a member havng a double row of marbles, or at 28 and 31 to form a member having a triple row of marbles, and so forth.

Referring to Figure 12, a plurality of sections 35 of the structural member of the present invention are shown positioned around the plate glass windows of a store front to provide a decorative border for the same. Obviously, the decorative border may be of any desired color or appearance, dependent upon the taste of the proprietor or the class of goods displayed.

While the decorative border strips formed by the structural members of this invention may simply be secured in any suitable way to the supporting structure for the plate glass, preferably said structural members should be so arranged that light from within the show window will pass through and be refracted by the decorative balls.

Referring to Figure 13, a section 36 of the structural member is shown positioned at the corner of the plate glass panes 37 and 38 of Figure 12. As is usual in such corner constructions, the panes of glass are clamped in any suitable manner between an inside angle bar 40 and an outside angle bar 41. In the construction shown, the outside angle bar is flattened throughout its length, as at 42, to facilitate the attachment of the structural member of this invention.

As more completely disclosed in Figures 14 and 15, the angle bar 41 along its flat surface 42 may be provided with a plurality of light emitting apertures 44, and on the outer surface of said bar suitable engaging lugs 45 may be provided at the spaces between the apertures 44.

In order to removably secure the sections of the structural member of this invention to the angle bar 41, the locking strip of the structural member may be provided with a plurality of locking apertures 46 which engage the heads of the locking lugs 45 to retain the structural member in place. In this connection, it will be noted that the locking apertures in the slide of the structural member are disposed between adjacent decorative balls, so that the heads of the locking lugs 45 will not engage the same. The slide of the structural member is also provided with a plurality of light emitting openings 47 between adjacent decorative balls of the structural member, said openings being positioned for alignment with the openings 44 in the angle bar 41 when the structural member is secured in position, as shown in Figure 14.

The inner angle member 40 is also provided with a plurality of light emitting openings 48, which are disposed in alignment with the openings 44 in the outer angle member 41, so that the light beams from the lights within the show window will pass through the aligned passages and be reflected and refracted by the decorative balls carried in the structural member.

From the above construction, it will be obvious that sections of the structural member of this invention may be removably positioned to form a border around a plate glass window or the like, for example, the plate glass window of a store front, as shown in Figure 12. After the sections of the structural member are positioned as described, any suitable means may be employed at the ends of the sections to retain the same in place, so that they cannot be removed by an unauthorized person. However, it is evident that the removable manner of securing the structural members in place will permit replacing of the sections of the structural member with sections of different color or appearance, so that the appearance of the window may be varied as the taste of the proprietor dictates, or to conform with the class or appearance of goods being displayed in the show case. It will be evident that many beautiful variations of the appearance of the show case or the like are possible by reason of the employment of the sections of the structural member of this invention.

The manner of securing the sections of the structural member to the window frame at positions other than corners will be apparent from Figure 13. When positioned between two adjacent panes in the same plane, the construction of Figure 13 may be used with the members 40 and 41 flat instead of angular in form.

In Figure 16, I have shown sections 49 of the structural member secured to the fender of an automobile, to indicate to following motorists the edge of the same. When a section of the structural member is thus employed, the decorative balls may be of a transparent medium to refract the light beams from the headlights of the following vehicle. It will be obvious that sections of the structural member can be likewise employed upon any object to indicate danger, whether said object is moving, such as a vehicle, or stationary. While I have shown the sections of the structural member applied to only one fender, obviously, the same may be attached to any or all of the fenders of the vehicle.

It will be apparent that I have devised an article of great utility and of distinctive and attractive appearance, and have evolved a convenient method of manufacturing the same.

It will be understood that the invention is not limited to the construction and adaptations shown in the drawings, as various changes could be made in the preferred construction and the article could be applied to other than the uses shown in the drawings.

I claim:—

1. An ornamental assembly comprising a hollow bar provided with a plurality of elliptical apertures, and decorative balls positioned within said bar and extending to the outside thereof through said apertures.

2. An ornamental assembly comprising a hollow bar provided with a plurality of elliptical apertures, and decorative balls positioned within said bar and extending to the outside thereof through said apertures, said balls having one diameter confined by the margin of said apertures, and one diameter unconfined by the margin of said apertures.

3. A structural member comprising a plurality of decorative elements and a hollow bar formed from a sheet of substantially rigid material bent into substantially columnar shape around said elements to confine the same, said bar being provided with a plurality of apertures through which portions of said decorative elements extend, and means for securing the opposing edges of said sheet to one another to maintain the sheet in substantially columnar form around said decorative elements.

4. The method of fabricating a structural member which comprises forming an aperture in a sheet of substantially rigid material, placing in said aperture a decorative element having a diameter greater than a diameter of said aperture, and bending said sheet of material around said decorative element to form a bar.

5. The method of fabricating a structural member which comprises forming a plurality of apertures in a sheet of substantially rigid material, placing in said apertures decorative elements having a diameter greater than a diameter of said apertures, and bending said sheet of material around said decorative elements to form a bar.

6. The method of fabricating a structural member which comprises forming a plurality of apertures in a sheet of substantially rigid material, placing in said apertures decorative balls having a diameter greater than a diameter of said apertures, and bending said sheet of material around said balls to form a bar.

7. The method of fabricating a structural member which comprises forming a plurality of elliptical apertures in a sheet of substantially rigid material, placing in said apertures decorative balls having a diameter greater than a diameter of said elliptical apertures, bending said sheet of material around said balls to form a bar, and securing together the opposing edges of said sheet.

8. The method of fabricating a structural member which comprises stamping a plurality of apertures in a sheet of substantially rigid material, forming locking flanges on opposite edges of said sheet of material, placing in said apertures decorative elements having a diameter greater than a diameter of said apertures, bending said sheet of material around said decorative elements to form a bar, and locking together said opposing edges of the sheet of material with a locking member which engages said locking flanges.

9. An ornamental assembly comprising a sheet portion of substantially rigid material having a series of apertures therein and a series of decorative elements, said sheet portion being bent around said elements to closely embrace and retain the same with portions of said elements extending through said apertures.

10. A structural member comprising a plurality of decorative balls and a sheet portion of substantially rigid material bent into substantially cylindrical form around said balls, said balls being confined within said sheet portion with parts of their surfaces protruding through said apertures, the diameter of said balls being greater than the diameter of the cylinder formed by said sheet portion.

11. An ornamental assembly comprising a plurality of hollow bars positioned side by side and secured to one another, said bars comprising a sheet portion of substantially rigid material having a series of apertures therein and a series of decorative elements, said sheet portions being bent around said elements to closely confine the same with portions of said elements protruding through said apertures.

12. A decorative assembly including a series of decorative balls and a sheet portion of substantially rigid material in which said balls are mounted, said sheet portion being provided with a series of cut-outs for said balls and being bent around the same, each of said balls being confined within said sheet portion and having a part thereof protruding through its corresponding cut-out in said sheet portion.

13. A decorative assembly including a series of decorative balls and a sheet portion of substantially rigid material in which said balls are mounted, said sheet portion being provided with a series of cut-outs for said balls and being bent around the same, said balls having diameters greater than the width of said cut-outs, whereby said balls are confined and retained within said sheet portion with a part of their surfaces protruding through said cut-outs.

14. The method of fabricating an ornamental assembly which comprises forming a plurality of apertures in a sheet of substantially rigid material, placing decorative elements in said apertures, and bending said sheet around said elements to closely embrace and retain the same with a part of their surfaces protruding through said apertures.

15. The method of fabricating an ornamental assembly which comprises forming a plurality of apertures in a sheet of substantially rigid material, placing in said apertures decorative elements having a diameter greater than a diameter of said apertures, and bending said sheet around said elements to closely embrace and retain the same with a part of their surfaces protruding through said apertures.

16. An ornamental assembly comprising a sheet portion of substantially rigid material having a series of apertures therein and a series of decorative elements, said elements being positioned within said apertures, and said sheet portion being bent around said elements and closely embracing and retaining the same with portions of said elements extending through said apertures.

17. An ornamental assembly comprising a sheet portion of substantially rigid material having a series of apertures therein and a series of decorative elements, said elements being positioned within said apertures, said sheet portion being bent around said elements, and said elements being wedged in said apertures with portions of said elements extending through said apertures.

18. An ornamental assembly comprising a sheet portion of substantially rigid material having a series of apertures therein, and a series of decorative elements, said elements having a greater diameter than the width of said apertures and being positioned within said apertures with said sheet portion bent around said elements and closely embracing the same, with portions of said elements extending through said apertures.

HENRY A. FISHER.